United States Patent [19]
Shibutani

[11] Patent Number: 6,107,426
[45] Date of Patent: Aug. 22, 2000

[54] DISPERSING STABILIZER

[75] Inventor: Mitsuo Shibutani, Ibaraki, Japan

[73] Assignee: The Nippon Synthetic Chemical Industry Co., Ltd., Osaka-fu, Japan

[21] Appl. No.: 09/092,918

[22] Filed: Jun. 8, 1998

[30] Foreign Application Priority Data

Jun. 11, 1997 [JP] Japan ................................ 9-171141

[51] Int. Cl.$^7$ ....................................................... C08F 18/00
[52] U.S. Cl. ............................................................. 526/320
[58] Field of Search ................................... 526/287, 288, 526/320, 330

[56] References Cited

U.S. PATENT DOCUMENTS 5,849,840  12/1998  Maruhashi et al. ....................... 525/56

FOREIGN PATENT DOCUMENTS

| | | |
|---|---|---|
| 0272012 | 6/1988 | European Pat. Off. . |
| 51-45189 | 4/1976 | Japan . |
| 56-55403 | 5/1981 | Japan . |
| 60-58402 | 4/1985 | Japan . |
| 61-108602 | 5/1986 | Japan . |
| 5105702 | 4/1993 | Japan . |
| 8283313 | 10/1996 | Japan . |
| 1167524 | 10/1969 | United Kingdom . |
| 2181143 | 4/1997 | United Kingdom . |

OTHER PUBLICATIONS

Abstract of Japanese Patent 59 155411, Sep. 4, 1984.

*Primary Examiner*—Ana Woodward
*Attorney, Agent, or Firm*—Browdy and Neimark, PLLC

[57] ABSTRACT

A dispersing stabilizer comprising a partially hydrolyzed polyvinyl alcohol resin having a degree of hydrolysis of 65 to 85% by mole, and containing 0.1 to 10% by mole of an oxyalkylene group in its side chains and 0.02 to 10% by mole of an anionic hydrophilic group in its side chains and/or terminal. The dispersing stabilizer is suitable for suspension polymerization, emulsion polymerization or postemulsification.

4 Claims, No Drawings

20

DISPERSING STABILIZER

BACKGROUND OF THE INVENTION

The present invention relates to a dispersing stabilizer used in suspension polymerization, emulsion polymerization or postemulsification. More particularly, the invention relates to a dispersing stabilizer which enables to carry out a polymerization of vinyl chloride or a mixture of vinyl chloride and other copolymerizable monomers is good workability and which can provide vinyl chloride polymers having excellent quality.

Conventionally, a suspension polymerization method wherein a vinyl chloride monomer is dispersed in an aqueous medium in the presence of a dispersing stabilizer and polymerized using an oil-soluble catalyst is widely used for industrial production of vinyl chloride polymers. In general, the primary factors controlling the quality of vinyl chloride polymers are polymerization conversion, water/monomer ratio, polymerization temperature, amount of catalyst, kind and amount of dispersing stabilizer, and the like. It is a general knowledge that among them, the influence of the dispersing stabilizer is greatest.

A polyvinyl alcohol resin having a specific degree of hydrolysis and a specific degree of polymerization can be used as the dispersing stabilizer, properties of the vinyl chloride polymers, such as plasticizer absorption property, fish eye and particle size can be controlled thereby.

Various polyvinyl alcohols suitable as the dispersing stabilizer or suspension polymerization method for the production of vinyl chloride polymers using such dispersing stabilizers are proposed, for example, a modified polyvinyl alcohol having a degree of hydrolysis of 60 to 90% by mole and containing 0.01 to 5% by mole of a hydrophobic group and 0.02 to 10% by mole of an anionic hydrophilic group in its side chains (Japanese Patent Publication Kokai No. 56-55403); a partially hydrolyzed polyvinyl alcohol having a degree of polymerization of at most 1,500 and a degree of hydrolysis of at most 90% by mole and containing carbonyl group and vinylene group adjacent thereto in its molecule (Japanese Patent Publication Kokai No. 51-45189); a polyvinyl alcohol resin containing carbonyl group and vinylene group adjacent thereto in its molecule and having a specific block character for the residual acetic acid group (Japanese Patent Publication Kokai No. 8-283313); a polyvinyl alcohol containing carbonyl group and vinylene group adjacent thereto in its molecule and having a specified cloud point (Japanese Patent Publication Kokai No. 5-105702); a polyvinyl alcohol having a specific ratio of weight average molecular weight to number average molecular weight and containing carbonyl group and vinylene group adjacent thereto in its molecule (Japanese Patent Publication Kokai No. 61-108602); and a dispersing stabilizer comprising a vinyl ester resin containing an oxyalkylene group in its side chains, or comprising the vinyl ester resin and a water-soluble high molecular weight material (Japanese Patent Publication Kokai No. 60-58402).

Recently, an ability to remove polymerization reaction heats from the polymerization vessel is greatly improved by improvement in structure of a jacket of a polymerization vessel and progress of operation technique for a reflux condenser. Also, temperature elevation time can be shortened by a hot water charging method, namely by charging a polymerization vessel with an aqueous medium which has been previously heated to a predetermined temperature. Thus, even in a large-sized polymerization vessel having a volume of at least 40 m$^3$ as used in an industrial production, it is possible to practice a high-speed polymerization which is completed in 6 hours.

However, known dispersing stabilizers have defects or are not satisfactory for use in high-speed polymerization of vinyl chloride or mixtures of vinyl chloride and other copolymerizable vinyl monomers. The dispersing stabilizer proposed in Japanese Patent Publication Kokai No. 56-55403 has the defects that adhesion of scale remarkably occurs owing to strong foaming during suspension polymerization of the vinyl chloride monomer and that although the modified polyvinyl alcohol is advantageous for the hot water charging because the cloud point can be adjusted by introduction of the anionic hydrophilic group, it does not satisfactory serve as protective colloid to oil droplets of monomer, so suspension polymerization of the vinyl chloride monomer may become unstable. As a result, coarse particles of vinyl chloride polymers may be produced and fish eyes may be generated.

The dispersing stabilizers proposed in Japanese Patent Publications Kokai No. 51-45189, No. 8-283313, No. 5-105702 and No. 61-108602 have the defects that since water-insoluble components are generated in the dispersing stabilizers and cause clogging of a strainer provided between a dissolving bath and a reaction vessel, productivity and workability are lowered, and that it is difficult to arbitrarily controll the cloud point of the polyvinyl alcohol polymer.

The dispersing stabilizer proposed in Japanese Patent Publication Kokai No. 60-58402 has the defect that there is a case where the cloud point cannot be properly adjusted, for instance, depending on the kind of modifier, e.g. ethylene oxide, and the amount of modifier for the polyvinyl alcohol polymer, particles of vinyl chloride polymers prepared by suspension polymerization may become remarkably coarse and large particles.

Also, in case of conventional dispersing stabilizers for suspension polymerization comprising a non-modified polyvinyl alcohol polymer, it is necessary to give consideration to conditions such as temperature of hot water to be charged into a reaction vessel or the cloud point of the non-modified polyvinyl alcohol polymer. Accordingly, such dispersing stabilizers may hinder the high-speed suspension polymerization of vinyl chloride monomers, and improvement thereof has been desired.

An object of the present invention is to provide a dispersing stabilizer suitable for use in suspension or emulsion polymerization of vinyl monomers such as vinyl chloride and mixtures of vinyl chloride and other copolymerizable vinyl monomers, or post emulsification of vinyl polymers such as vinyl chloride homopolymer and copolymers.

A further object of the present invention is to provide a dispersing stabilizer suitable for suspension polymerization of vinyl monomers such as vinyl chloride and mixtures of vinyl chloride and other copolymerizable vinyl monomers, which enables to carry out the polymerization in a good workability and can produce vinyl polymers such as vinyl chloride polymers having excellent quality.

A still furhter object of the present invention is to provide a dispersing stabilizer suitable for suspension polymerization of the vinyl monomers, which does not cause adhesion of scale owing to foaming during suspension polymerization, which is applicable to a hot water charging polymerization method without any restriction in the temperature of hot water to be charged in suspension polymerization and the manner of charging the dispersing agent, which can produce vinyl polymers such as vinyl chloride polymers which do not contain coarse particles, have good properties such as plasticizer absorption property and give molded articles having no fish eye.

These and other objects of the present invention will become apparent from the description hereinafter.

SUMMARY OF THE INVENTION

In accordance with the present invention, there is provided a dispersing stabilizer comprising a partially hydrolyzed polyvinyl alcohol resin having a degree of hydrolysis of 65 to 85% by mole, and containing 0.1 to 10% by mole of an oxyalkylene group, in its side chains, represented by the formula (1):

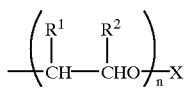

(1)

wherein $R^1$ is hydrogen atom or an alkyl group, $R^2$ is an alkyl group, X is hydrogen atom, an alkyl group, an alkylamide group or an alkyl ester group, and n is a positive number, and
0.02 to 10% by mole of an anionic hydrophilic group, in its side chains and/or terminal.

The dispersing stabilizer of the present invention can be used for suspension and emulsion polymerizations of vinyl monomers and postemulsification of vinyl polymers. It is particularly suitable for suspension polymerizaiton of vinyl chloride and mixtures of vinyl chloride and other copolymerizable monomers and is applicable to a hot water charging polymerization method in a good workability, and provides vinyl chloride polymers which contain no coarse particles and have a narrow particle size distribution, which have a good plasticizer absorption property and accordingly are excellent in processability, and give molded articles having remarkably reduced fish eyes. Also, adhesion of scale to a reactor owing to foaming in suspension polymerization is remarkably decreased by the use of the dispersing stabilizer of the invention.

DETAILED DESCRIPTION

It is necessary that the partially hydrolyzed polyvinyl alcohol resin used in the present invention has a degree of hydrolysis of 65 to 85% by mole. It is preferable that the resin has a degree of hydrolysis of 65 to 83% by mole, especially 70 to 83% by mole, more especially 73 to 83% by mole. If the degree of hydrolysis exceeds 85% by mole, the surface activity required as a dispersing stabilizer is lowered, so that the dispersing force to oil droplets of monomer is lowered. If the degree of hydrolysis is less than 65% by mole, the partially hydrolyzed polyvinyl alcohol resin becomes insoluble in water, so that the dispersing stabilizer lacks in action of protective colloid.

The partially hydrolyzed polyvinyl alcohol resin is also required to contain an oxyalkylene group represented by the formula (1) in its side chains. In formula (1), n is preferably an integer within the range of $2 \leq n \leq 60$, more preferably $6 \leq n \leq 25$, the most preferably $6 \leq n \leq 20$. If n is more than 60, the cloud point of the partially hydrolyzed polyvinyl alcohol resin is easy to appear or is lowered, so that the temperature of hot water dispersing medium used in hot water charging method must be adjusted to a temperature lower than the cloud point of the partially hydrolyzed polyvinyl alcohol resin. If n is less than 2, the surface activity of the partially hydrolyzed polyvinyl alcohol resin is lowered.

In formula (1), it is necessary that $R^1$ is hydrogen atom or an alkyl group preferably having 1 to 3 carbon atoms and $R^2$ is an alkyl group preferably having 1 to 3 carbon atoms. $R^1$ is preferably hydrogen atom. $R^2$ is not particularly limited so long as $R^2$ is an alkyl group, and $R^2$ is preferably methyl group.

It is necessary that the partially hydrolyzed polyvinyl alcohol resin contains 0.1 to 10% by mole of the oxyalkylene group represented by the formula (1). The content of the oxyalkylene group is preferably 0.1 to 5% by mole, more preferably 0.2 to 1% by mole, the most preferably 0.2 to 0.8% by mole. If the content of the oxyalkylene group is less than 0.1% by mole, the surface activity cannot be sufficiently exhibited. If the content of the oxyalkylene group is more than 10% by mole, the blocking property of vinyl acetate component in the partially hydrolyzed polyvinyl alcohol resin is lowered, and rather the surface activity becomes insufficient or the cloud point is easy to appear. As a result, because a monomer becomes difficult to be uniformly suspended and stabilized in the form of oil droplets in an aqueous medium upon the hot water charging, suspension polymerization stability is lowered. Accordingly, the obtained vinyl polymers such as vinyl chloride polymers contain a large amount of coarse particles and fish eyes increase, so that the object of the present invention cannot be achieved.

The partially hydrolyzed polyvinyl alcohol resin is also required to contain an anionic hydrophilic group in its side chains and/or terminal. Examples of the anionic hydrophilic group are, for instance, carboxyl group such as carboxyl group derived from an unsaturated aliphatic carboxylic acid, sulfonic acid group, phosphoric acid group and the like. The anionic hydrophilic group is preferably carboxyl group.

The content of the anionic hydrophilic group is 0.02 to 10% by mole, preferably 0.02 to 1.0% by mole. If the content of the anionic hydrophilic group is less than 0.02% by mole, the dispersing stabilizer is easy to be restricted by charging temperature when used in suspension polymerization of vinyl monomers, particularly vinyl chloride monomer, carried out by a hot water charging method. Thus, the vinyl chloride polymers obtained under some condition of temperature during contact of monomer droplets with the dispersing stabilizer are not satisfactory in that the attenuation speed of fish eye is lowered, permanent fish eyes are generated, or particle size distribution becomes wide. If the content of the anionic hydrophilic group is more than 10% by mole, the protective colloid characteristics of the dipsersing stabilizer is lowered and, therefore, the suspension polymerization stability is lowered, so the obtained vinyl chloride polymers contain coarse particles in a large amount, and sometimes the polymerization products are obtained in the form of blocks. Furthermore, water-insoluble components are increased in the dispersing stabilizer, thus resulting in increase in permanent fish eyes included in particles of the vinyl chloride polymers prepared by suspension polymerization.

The partially hydrolyzed polyvinyl alcohol resin according to the present invention can be prepared by any known methods, for instance, ① a method comprising copolymerizing a vinyl ester monomer with an anionic hydrophilic group-containing monomer and then hydrolyzing the resulting copolymer in the presence of a (poly)alkylene oxide;

② a method comprising copolymerizing an unsaturated monomer containing an oxyalkylene group represented by the formula (1) and an anionic hydrophilic group-containing monomer with a vinyl ester monomer and then hydrolyzing the resulting copolymer; and ③ a method comprising postreacting an anionic hydrophilic group-containing polyvinyl alcohol resin with an alkylene oxide.

Among them, the method ② is practical from the viewpoints of productivity and quality of the resin. The method ② is mainly explained below.

Examples of the unsaturated monomer containing the oxyalkylene group represented by the formula (1) are shown below, but the unsaturated monomer is not limited to these examples.

(Meth)acrylic acid ester type: Compounds represented by the formula (3):

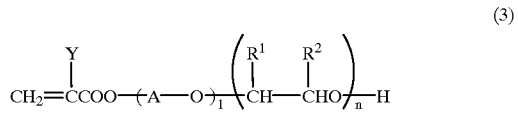

(3)

wherein Y is hydrogen atom or methyl group, A is phenylene group or a substituted phenylene group, $R^1$ is hydrogen atom or an alkyl group, $R^2$ is an alkyl group, l is 0 or an integer of at least 1, and n is a positive number, preferably an integer of 2 to 60, more preferably an integer of 6 to 25, the most preferably an integer of 6 to 20.

A typical example of the compounds of the formula (3) is polyoxypropylene (meth)acrylate.

(Meth)acrylic acid amide type: Compounds represented by the formula (4):

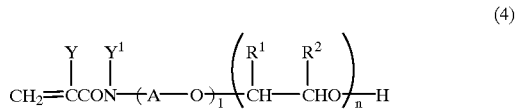

(4)

wherein $Y^1$ is hydrogen atom or methyl group, and Y, A, $R^1$, $R^2$, l and n are as defined above.

A typical example of the compounds of the formula (4) is polyoxypropylene (meth)acrylic amide.

(Meth)allyl alcohol type: Compounds represented by the formula (5):

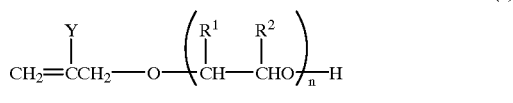

(5)

wherein Y, $R^1$, $R^2$ and n are as defined above.

A typical example of the compounds of the formula (5) is polyoxypropylene (meth)allyl ether.

Vinyl ether type: Compounds represented by the formula (6):

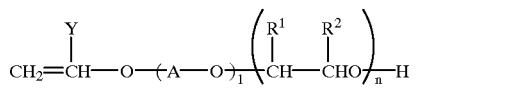

(6)

wherein Y, A, $R^1$, $R^2$, l and n are as defined above.

A typical example of the compounds of the formula (6) is polyoxypropylene vinyl ether.

Among these unsaturated monomers containing the oxyalkylene group, the (meth)allyl alcohol type compounds of represented by the formula (5) are preferably used.

The term "anionic hydrophilic group-containing monomer" as used herein encompasses compounds containing an anionic hydrophilic group which serves as a chain transfer agent.

Examples of the anionic hydrophilic group-containing monomer are, for example, an unsaturated aliphatic carboxylic acid, a sulfonic acid group-containing monomer, a phosphoric acid-containing monomer, a carboxyl group-containing alcohol, aldehyde or thiol, and a sulfonic acid group-containing alcohol, aldehyde or thiol.

Examples of the unsaturated aliphatic carboxylic acid are, for instance, an ethylenically unsaturated dicarboxylic acid such as maleic acid, fumaric acid or itaconic acid; an ethylenically unsaturated dicarboxylic acid monoester such as a maleic acid monoalkyl ester, a fumaric acid monoalkyl ester or an itaconic acid monoalkyl ester; an ethylenically unsaturated dicarboxylic acid diester such as a maleic acid dialkyl ester, a fumaric acid dialkyl ester or an itaconic acid dialkyl ester; an ethylenically unsaturated dicarboxylic acid anhydride such as maleic anhydride or itaconic anhydride; (meth)acrylic acid; and salts thereof. Among them, the ethylenically unsaturated dicarboxylic acid, the ethylenically unsaturated discarboxylic acid monoester and their salts are preferably used.

Among the carboxyl group-containing alcohol, aldehyde and thiol compounds, particularly effective are those derived from thiols having a large chain transfer effect, examples of which are:

a compound represented by the formula (7):

(7)

wherein n is an integer of 1 to 5, and a salt thereof;
a compound represented by the formula (8):

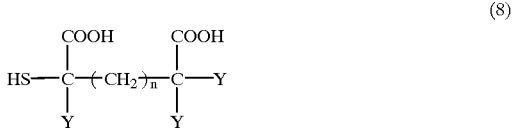

(8)

wherein groups Y are independently hydrogen atom or a lower alkyl group preferably having 1 to 4 carbon atoms, which may have a substituent, and n is 0 or an integer of 1 to 5, and a salt thereof;
a compound represented by the formula (9):

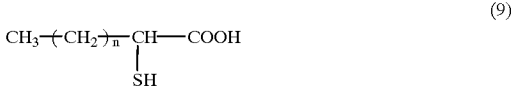

(9)

wherein n is 0 or an integer of 1 to 20, and a salt thereof; and a compound represented by the formula (10):

(10)

wherein $X^1$ is hydrogen atom or carboxyl group, $X^2$ is hydrogen atom or SH, r is 0 or a positive number, and s is a positive number. Typical examples of the compounds (7), (8) and (9) are mercaptoacetic acid, 2-mercaptopropionic acid, 3-mercaptopropionic acid and 2-marcaptostearic acid. Typical examples of the compound (10) are dithiosuccinic acid and thiomalic acid.

Examples of the sulfonic acid group-containing monomer are:
(i) an olefinsulfonic acid such as ethylenesulfonic acid, allylsulfonic acid or methallylsulfonic acid, and a salt thereof;

(ii) a sulfoalkyl maleate represented by the formula (11) or (12):

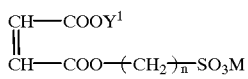

(11)

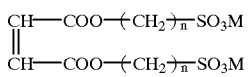

(12)

wherein $Y^1$ is an alkyl group preferably having 1 to 4 carbon atoms, M is hydrogen atom, an alkali metal or ammonium ion, and n is an integer of 2 to 4,
e.g. sodium sulfopropyl 2-ethylhexyl maleate, sodium sulfopropyl tridecyl maleate and sodium sulfopropyl eicosyl maleate;

(iii) a sulfo group-containing (meth)acrylic compound such as:
a sulfoalkyl(meth)acrylamide represented by the formula (13), (14) or (15):

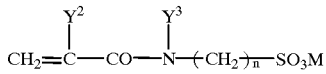

(13)

wherein $Y^2$ and $Y^3$ are independently hydrogen atom or an alkyl group preferably having 1 to 4 carbon atoms, M is hydrogen atom, an alkali metal or ammonium ion, and n is an integer of 2 to 4,

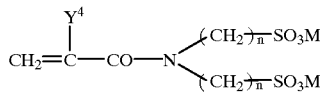

(14)

wherein $Y^4$ is hydrogen atom or an alkyl group preferably having 1 to 4 carbon atoms, M is hydrogen atom, an alkali metal or ammonium ion, and n is an integer of 2 to 4,

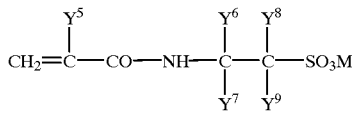

(15)

wherein $Y^5$, $Y^7$, $Y^8$ and $Y^9$ are independently hydrogen atom or an alkyl group preferably having 1 to 4 carbon atoms, $Y^6$ is an alkyl group preferably having 1 to 4 carbon atoms, M is hydrogen atom, an alkali metal or ammonium ion, and n is an integer of 2 to 4; and
a sulfoalkyl (meth)acrylate represented by the formula (16):

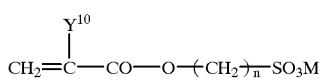

(16)

wherein $Y^{10}$ is hydrogen atom or an alkyl group preferably having 1 to 4 carbon atoms, M is hydrogen atom, an alkali metal or ammonium ion, and n is an integer of 2 to 4.

Typical examples of the sulfoalkyl(meth)acrylamides of the formulas (13), (14) and (15) are sodium sulfomethylacrylamide, sodium sulfo-t-butylacrylamide, sodium sulfo-S-butylacrylamide and sodium sulfo-t-butylmethacrylamide. A typical example of the sulfoalkyl (meth)acrylate of the formula (16) is sodium sulfoethyl acrylate.

Among the above sulfonic acid group-containing monomers, the olefinsulfonic acid and salt thereof are preferably used.

Among the sulfonic acid group-containing compounds which serve as a chain transfer agent such as a sulfonic acid group-containing alcohol, a sulfonic acid group-containing aldehyde or a sulfonic acid group-containing thiol, particularly effective are those derived from thiols. Examples of the sulfonic acid group-containing thiol compound are:
a compound represented by the formula (17):

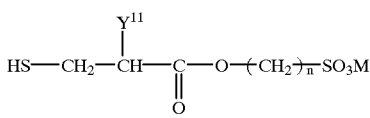

(17)

wherein $Y^{11}$ is hydrogen atom or methyl group, M is hydrogen atom, an alkali metal or ammonium ion, and n is an integer of 2 to 4,
a compound represented by the formula (18):

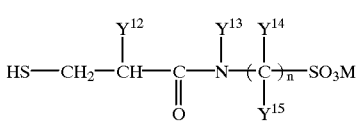

(18)

wherein $Y^{12}$, $Y^{13}$, $Y^{14}$ and $Y^{15}$ are independently hydrogen atom or methyl group, M is hydrogen atom, an alkali metal or ammonium ion, and n is an integer of 2 to 4, in which as to each of $Y^{14}$ and $Y^{15}$, the n groups may be the same or different,
a compound represented by the formula (19):

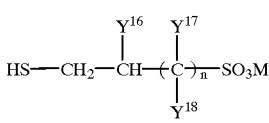

(19)

wherein $Y^{16}$, $Y^{17}$ and $Y^{18}$ are independently hydrogen atom or methyl group, M is hydrogen atom, an alkali metal or ammonium ion, and n is an integer of 2 to 4, in which as to each of $Y^{17}$ and $Y^{18}$, the n groups may be the same or different, and
a compound represented by the formula (20):

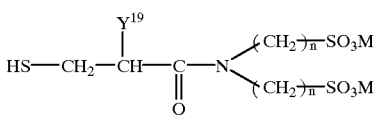

(20)

wherein $Y^{19}$ is hydrogen atom or methyl group, M is hydrogen atom, an alkali metal or ammonium ion, and n is an integer of 2 to 4.

A typical example of the sulfonic acid group-containing thiol is sodium thiopropionate sulfopropane.

Sulfonic acid group can also be introduced into polyvinyl alcohol resin by: a method comprising treating a polyvinyl alcohol with bromine or iodine and then heating the treated polyvinyl alcohol in an aqueous solution of acid sodium sulfite, a method comprising heating a polyvinyl alcohol in a concentrated aqueous solution of sulfuric acid, or a method comprising acetalizing a polyvinyl alcohol with a sulfonic acid group-containing aldehyde.

Examples of a vinyl ester monomer to be copolymerized with the above-mentioned oxyalkylene group-containing monomer and anionic hydrophilic group-containing monomer are, for example, vinyl formate, vinyl acetate, vinyl trifluoroacetate, vinyl propionate, vinyl butyrate, vinyl caprate, vinyl laurate, vinyl palmitate, vinyl stearate and vinyl pivalate. These are used alone or in admixture thereof. Among them, vinyl acetate is industrially preferable.

In the present invention, other monomers as generally used in the production of polyvinyl alcohol resins, other than the monomer having the oxyalkylene group represented by the formula (1), the anionic hydrophilic group-containing monomer and the vinyl ester monomer may be used in the polymerization in an amount of at most 10% by mole, preferably at most 2% by mole, based on the whole monomer. Examples of the other monomers are, for instance, (a) an ethylenically unsaturated carboxylic acid alkyl ester such as methyl crotonate, ethyl crotonate, methyl sorbate, ethyl sorbate, methyl (meth)acrylate, ethyl (meth)acrylate, propyl (meth)acrylate, butyl (meth)acrylate, pentyl (meth)acrylate, heptyl (meth)acrylate, octyl (meth)acrylate, decyl (meth)acrylate, hexadecyl (meth)acrylate or octadecyl (meth)acrylate; (b) an α-olefin such as ethylene, propylene, α-hexene, α-octene, α-decene, α-dodecene, α-hexadecene or α-octadecene; (c) an alkyl vinyl ether such as propyl vinyl ether, butyl vinyl ether, hexyl vinyl ether, octyl vinyl ether, decyl vinyl ether, dodecyl vinyl ether, tetradecyl vinyl ether, hexadecyl vinyl ether or octadecyl vinyl ether; (d) an alkyl allyl ether such as propyl allyl ether, butyl allyl ether, hexyl allyl ether, octyl allyl ether, decyl allyl ether, dodecyl allyl ether, tetradecyl allyl ether, hexadecyl allyl ether or octadecyl allyl ether; and (e) other vinyl compounds such as (meth)acrylamide, (meth)acrylonitrile, styrene and vinyl chloride.

A method for copolymerizing the monomer mixture is not particularly limited and the copolymerization can be carried out by known polymerization methods. In general, the copolymerization is carried out by a solution polymerization using a solvent, e.g. an alcohol such as methanol, ethanol or isopropanol, preferably methanol. Emulsion polymerization and suspension polymerization can be of course carried out.

In solution polymerization, the monomer mixture can be charged into a reactor by various methods, for example, a method comprising starting polymerization of the vinyl ester monomer and continuously or intermittently adding the remaining monomers thereto during polymerization, a method comprising starting polymerization of the vinyl ester monomer and adding the remaining monomers at a time in the initial stage of the polymerization, and a method comprising simultaneously adding the vinyl ester monomer and the other monomers from the start of polymerization.

When a chain transfer agent is used in the polymerization, in order to achieve a desired degree of modification, it is preferable to add the chain transfer agent to the polymerization system according to the extent of reaction of the vinyl ester monomer present in the polymerization system so as not to largely vary the amount of chain transfer in the polymerization system with respect to the vinyl ester. The copolymerization is carried out by using a usual radical polymerization catalysts such as azobisisobutyronitrile, acetyl peroxide, benzoyl peroxide or lauroyl peroxide, and a low-temperature activated catalyst such as di-n-propyl dicarbonate. The polymerization temperature is within the range of 30° C. to the boiling point of the solvent.

The thus obtained copolymer is dissolved in a solvent such as an alcohol, benzene or methyl acetate, and hydrolyzed in the presence of a hydrolysis catalyst such as an alkali catalyst. Examples of the alcohol are, for instance, methanol, ethanol, isopropanol and butanol. Methanol is preferred, and a mixed solvent of methanol and methyl acetate is more preferred. The concentration of the copolymer in the solution to be subjected to the hydrolysis is from 20 to 60% by weight.

Preferable examples of the hydrolysis catalyst are alkali catalysts, e.g., an alkali metal hydroxide such as sodium hydroxide or potassium hydroxide and an alkali metal alcoholate such as sodium methylate, sodium ethylate or potassium methylate. The amount of the hydrolysis catalyst is 1 to 100 mmol, preferably 1 to 50 mmol, more preferably 1 to 30 mmol, per mol of the vinyl ester unit.

An acid catalyst such as sulfuric acid or hydrochloric acid can be used for hydrolysis.

Thus, the partially hydrolyzed polyvinyl alcohol resin according to the present invention is obtained in a manner as mentioned above. The average degree of polymerization (PA) of the partially hydrolyzed polyvinyl alcohol resin is not particularly limited, but is preferably from 400 to 2,000, more preferably 500 to 1,000, the most preferably 600 to 900. The average degree of polymerization (PA) is measured in accordance with JIS (Japanese Industrial Standard) K 6726.

It is preferable that the average degree of polymerization (PA) of the partially hydrolyzed polyvinyl alcohol resin and the content "a" (% by mole) of the anionic hydrophilic group therein satisfy the relation represented by the equation (2):

$$0.1 < PA \times a \times 10^{-2} < 2 \qquad (2)$$

The equation (2) indicates that less than two anionic hydrophilic groups are contained per one molecular chain, regardless of the degree of polymerization of the partially hydrolyzed polyvinyl alcohol resin. When the numerical value of "$PA \times a \times 10^{-2}$" is 2 or more, the suspension polymerization stability of vinyl monomers is lowered and also, the vinyl (chloride) polymers are obtained in the form of a coarse particles or block. When the numerical value of "$PA \times a \times 10^{-2}$" is 0.1 or less, the dispersing stabilizer is apt to be restricted by charging temperature when used in suspension polymerization of vinyl monomers carried out by a hot water charging method. Thus, satisfactory vinyl polymers are not obtained under some condition of temperature during contact of monomer droplets with the dispersing stabilizer, so the attenuation speed of fish eye is lowered, or permanent fish eyes are generated, or particle size distribution becomes wide.

The amount of the anionic hydrophilic group introduced into the partially hydrolyzed polyvinyl alcohol resin, which satisfies the equation (2), is designed so that appearance of the cloud point can be controlled only by adjustment of the amount of the dispersing stabilizer within a usual range of the amount of a polyvinyl alcohol which has been conventionally used for suspension polymerization of vinyl monomers, namely within the range of 0.01 to 0.2 part by weight per 100 parts by weight of the vinyl monomers. Accordingly, the partially hydrolyzed polyvinyl alcohol according to the present invention can be used as the dispersing stabilizer in a hot water charging polymerization without any restriction of the temperature of hot water which is usually selected from the range of 20° to 90° C. without exerting a bad influence on the monomer droplet dispersing ability. As a result, vinyl chloride polymers capable of providing molded articles of excellent quality performances can be obtained without producing 60 mesh on coarse particles, namely coarse particles having larger particle size than mesh size of 60 mesh sieve.

In the present invention, it is preferable that the absorbance at a wavelength of 280 nm in ultraviolet ray absorption spectrum with respect to a 0.1% by weight aqueous solution of the partially hydrolyzed polyvinyl alcohol resin is at least 0.1, especially at least 0.2, more especially at least 0.25. When the absobance at a wavelength of 280 nm is at least 0.1, the adsorptive power of the polyvinyl alcohol resin as a dispersing stabilizer for monomer droplets can be improved, so the surface activity such as protective colloidal ability of the dispersing stabilizer of the present invention can be improved.

The absorbance at a wavelength of 280 nm is assigned to a structure of carbonyl-containing group represented by the formula:

wherein R is hydrogen atom or an alkyl group preferably having 1 to 8 carbon atoms, and n is 0 or 2. This structure is produced by introduction of carbonyl group into a molecule based on chain transfer with an aldehyde added during polymerization, followed by a decarboxylic acid reaction of vinyl ester group or a dehydration reation of hydroxyl group. The control of the absorbance can be achieved by adjusting the amount of the aldehyde added in the polymerization of a vinyl ester monomer and the ratio of the solvent to the vinyl ester monomer.

Examples of the aldehyde are, for instance, acetaldehyde, propionaldehyde, butylaldehyde and benzaldehyde. Among them, acetaldehyde is preferable.

The amount of the aldehyde is usually from 0.1 to 5% by weight, preferably 0.5 to 3% by weight, more preferably 0.7 to 1.5% by weight, based on the vinyl ester monomer.

The ratio of solvent to vinyl ester monomer varies depending on the kinds of solvent and monomer, the desired degree of polymerization and others. For instance, when methanol is used as the solvent and vinyl acetate is used as the vinyl ester monomer, the solvent/vinyl ester monomer (methanol/vinyl acetate) ratio is suitably selected from the range of 0.02 to 1, preferably 0.03 to 0.5, according to the desired degree of polymerization of polyvinyl alcohol resins to be produced.

The dispersing stabilizer of the present invention comprises the partially hydrolyzed polyvinyl alcohol resin as explained above. The dispersing stabilizer can be used in suspension polymerization or emulsion polymerization of vinyl monomers and postemulsification of vinyl polymers, and is particularly useful for suspension homopolymerization and copolymerization of vinyl chloride.

The use of the dispersing stabilizer in suspension polymerization of vinyl chloride or its mixture with other copolymerizable monomers is explained below.

When the dispersing stabilizer of the present invention is used in the suspension polymerization, various auxiliary dispersants can be used together therewith. By the combination use of the dispersing stabilizer with the auxiliary dispersant, formation of a skin layer in the surface of particles of vinyl chloride polymers is prevented and agglomeration of primary particles having a diameter of one to several microns is controlled. As a result, physical properties of the obtained vinyl chloride polymers, such as porosity distribution, absorption property for plasticizers and monomer elimination property are further improved.

A preferable auxiliary dispersant is a partially hydrolyzed polyvinyl alcohol having a degree of hydrolysis of less than 65% by mole, especially 30 to 60% by mole, and a degree of polymerization of 100 to 750, especially 180 to 650. Although the weight ratio of the dispersing stabilizer to the auxiliary dispersant (dispersing stabilizer/auxiliary dispersant) varies depending on the kind of dispersing stabilizer and the like, the weight ratio is preferably from 30/70 to 90/10, more preferably 50/50 to 80/20.

The auxiliary dispersant is water-insoluble or water-dispersible. It may be those provided with a self-emulsifying property by introduction of an ionic group. Typical examples of the auxiliary dispersant are auxiliary dispersants commercially available under the trademark Gohsefimer LL-02, L-5407, L-7514, LW100, LW200, LW300 and LS210 which are made by The Nippon Synthetic Chemical Industry Co., Ltd., auxiliary dispersants commercially available under the trademark LM-20, LM-25 and LM-10HD which are made by KURARAY CO., LTD, an auxiliary dispersant commercially available under the trademark Alcotex 55-002H which is made by Harlow Chemical Co., Ltd. and auxiliary dispersants commercially available under the trademark Sigma 404W and Sigma 202 which are made by Sigma Italiana Prodotti Chimici S.P.A.

The dispersing stabilizer and the auxiliary dispersant may be added to a polymerization system at a time in the initial stage of polymerization in a lump, or may be intermittently added to a polymerization system until the conversion reaches 50%.

So long as effects of the present invention are not hindered, the dispersing stabilizer of the present invention may be used in combination with other additives, e.g., a water-soluble cellulose ether such as methyl cellulose, hydroxycellulose, hydroxypropyl cellulose or hydroxypropyl methyl cellulose; a water-soluble polymer such as a polyvinyl alcohol having a degree of hydrolysis of 65 to 98% by mole or gelatin; an oil-soluble emulsifier such as sorbitane monolaurate, sorbitane trioleate, glycerin tristearate or ethylene oxide-propylene oxide block copolymer; and a water-soluble cationic, anionic or non-ionic emulsifier.

The polymerization initiator to be used is not particularly limited so long as it is oil-soluble. Examples of the polymerization initiator are, for instance, di-2-ethylhexyl peroxydicarbonate, di(2-ethoxyethyl) peroxydicarbonate, t-butyl peroxyneodecanoate, α-cumyl peroxyneodecanoate, t-butyl peroxypivalate, γ-cumyl peroxyneodecanoate, benzoyl peroxide, lauroyl peroxide, diisopropyl peroxydicarbonate, α,α'-azobisisobutyronitrile, α,α'-azobis-2,4-dimethylvaleronitrile, acetylcycrohexylsulfonyl peroxide and mixtures thereof. Although the amount of the polymerization initiator varies depending on the kind of initiator and the polymerization conditions such as temperature, the initiator is usually employed in an amount of 0.01 to 2 parts by weight per 100 parts by weight of the monomer.

A proper amount of a water-soluble polymerization inhibitor such as ammonium thiocyanate or a nitrite may be used, as occasion demands, in order to prevent the generation of scale. Various other agents as conventionally used in the polymerization of vinyl monomers may also be optionally used, e.g., a pH regulator, a crosslinking agent, and a polymerization regulator such as mercaptoethanol and other thiol compounds, acetaldehyde, butylaldehyde or trichloroethylene.

The polymerization temperature is suitably selected from a range known to a person skilled in the art according to the degree of polymerization of desired vinyl chloride polymers. In general, the polymerization temperature is from 30° to 80° C. The suspension polymerization is carried out usually in a system of a monomer/water ratio of 0.5 to 1. Water may be additionally added to the polymerization system during the polymerization in order to supplement lowering of liquid level owing to shrinkage of volume in polymerization. The addition of additional water is rather preferred since generation of fish eye can be refrained.

In the present invention, water, a vinyl monomer, the dispersing stabilizer, a polymerization initiator and a chain transfer agent can be charged in a reactor by any procedures conventionally adopted for suspension homo and copolymerization of vinyl chloride. The amount of the dispersing stabilizer is not particularly limited. In general, the amount of the dispersing stabilizer is at most 5 parts by weight, preferably 0.01 to 1 part by weight, more preferably 0.02 to 0.2 part by weight, per 100 parts by weight of the monomer.

In the preparation of vinyl chloride polymers, the charging temperature of an aqueous medium such as water is not particularly limited. To say nothing of water of ordinary temperature of about 20° C., hot water up to about 97° C. can be used. In order to shorten the time required for raising the temperature upon the polymerization, it is preferable to use a previously heated water instead of non-heated water of ordinary temperature. In that case, a hot water previously heated to 40° to 97° C., preferably about 40° to about polymerization starting temperature (50° to 65° C.), is used. By using the dispersing stabilizer of the present invention, excellent vinyl chloride homo and copolymers can be prepared without any influence of the temperature of hot water charged in suspension polymerization on properties of the produced polymers, such as particle size, particle size distribution and plasticizer absorption property.

No special stirring procedure or apparatus is required in the suspension polymerization, and there can be used various known stirring apparatuses which have been usually used in suspension polymerization of vinyl chloride. Examples of a stirring blade are usual stirring blades such as pfaudler blade, paddle blade, turbine blade, fanturbine blade and brumargine blade. Particularly, pfaudler blade is preferably used. Also, there is no particular limitation in a combination of the stirring blade with a baffle. Examples of the baffle are a plate type baffle, a cylinder type baffle, a D type baffle, a loop type baffle and a finger type baffle.

The suspension polymerization using the dispersing stabilizer of the present invention is applicable to not only homopolymerization of vinyl chloride but also copolymerization of vinyl chloride with other copolymerizable monomer. Examples of the other copolymerizable monomer are, for instance, a vinylidene halogenide, a vinyl ether, vinyl acetate, vinyl benzoate, acrylic acid, methacrylic acid, maleic acid, their acid anhydride, ethylene, propylene and styrene.

Although the above explanation is mainly addressed to polymerization of vinyl chloride monomers, the dispersing stabilizer of the present invention is not limited to use only for vinyl chloride. The dispersing stabilizer of the present invention can be used for suspension polymerization of any vinyl ester monomers such as styrene, vinyl acetate and a methacrylic acid ester.

Furthermore, the dispersing stabilizer of the present invention is useful for preparation of emulsions by an emulsion polymerization method or a postemulsification method.

When the dispersing stabilizer of the present invention is used, properties of produced vinyl polymers, particularly vinyl chloride polymers, are hardly affected by change of the temperature condition or the like in a hot water charging suspension polymerization method. Thus, as compared with conventional dispersing stabilizers, the amount of coarse particles included in the obtained vinyl polymers is very slight, the particle size distribution is sharp, the processability is good because of good absorption property for various plasticizers, and little fish eye is generated. Furthermore, there is little adhesion of scale owing to foaming during suspension polymerization.

The present invention is more specifically described and explained by means of the following Examples, in which all % and parts are by weight unless otherwise noted. It is to be understood that the present invention is not limited to the Examples.

EXAMPLE 1

A 1 $m^3$ polymerization vessel was charged with 40 kg of methanol, and thereto were added 15.1 kg of a polyoxypropylene(15) monoallyl ether (average number of moles of oxypropylene added: 15), 0.25 kg of a 60% solution of monomethyl maleate in methanol, 399.8 kg of vinyl acetate and 4.72 kg of acetaldehyde. Thereto was then added 60.8 g of 2,2'-azobisisobutyronitrile, and the copolymerization was started at an inner temperature of 60° C. When the polymerization conversion reached 40%, 0.25 kg of the 60% methanol solution of monomethyl maleate was added thereto, and the copolymerization was further carried out for 7 hours (polymerization conversion: 95%).

The residual monomers were then purged from the vessel until the amount of residual monomers reached $4.71 \times 10^{-4}$%, and thereto was added a methanol solution containing 7.4% by mmole (based on vinyl acetate) of sodium hydroxide. The hydrolysis was carried out at 35° C. for 2 hours in methanol, and the obtained resin was dried to give a partially hydrolyzed polyvinyl alcohol resin (dispersing stabilizer 1) as shown in Table 1.

Then, by using the dispersing stabilizer 1, vinyl chloride was polymerized by the following polymerization method A or B to give a polyvinyl chloride. Properties of the polyvinyl chloride particles were evaluated in accordance with the following methods.

Polymerization method A

A 100 liter autoclave which was degassed to 30 mmHg was charged with 45 kg of deionized water of 57° C. and 18 g of the dispersing stabilizer 1 shown in Table 1. The jacket temperature of the autoclave was adjusted to 51° C. and the autoclave was charged with 30 kg of vinyl chloride with stirring. The inside temperature of the autoclave after the completion of charging was 50° C. Then, the autoclave was charged with 13 g of 2,4,4-trimethylpentyl 2-peroxyneodecanoate and 6 g of ($\alpha,\alpha$-bis-neodecanoylperoxy)diisopropylbenzene, and the polymerization was started at 51° C. After 5 hours, the inside pressure of the autoclave dropped by 1.5 kg/cm² than at the initial pressure, so the polymerization was stopped by adding 3 g of 2,6-di-t-butyl-4-methylphenol thereto. Unreacted vinyl chloride was purged therefrom, and the contents in the autoclave were taken out, dehydrated and dried to give a polyvinyl chloride. Properties of the polyvinyl chloride were evaluated. The results are shown in Table 2.

Polymerization method B

A polyvinyl chloride was prepared in the same manner as in the Polymerization method A except that deionized water of 35° C. was used instead of deionized water of 57° C.

Properties of the polyvinyl chloride were evaluated. The results are shown in Table 2.

(1) Average degree of polymerization

Average degree of polymerization was measured in accordance with JIS (Japanese Industrial Standard) K 6721.

(2) Particle size

① Average particle size

On the basis of particle size distribution measured by a ro-tap vibrating sieve (JIS sieve), median size (50% weight size) was calculated and defined as average particle size.

② Coarse particles

A predetermined amount of particles of the polyvinyl chloride was sieved with a 60 mesh JIS standard sieve and a 80 mesh JIS standard sieve, and (i) content (%) of 60 mesh on particles (particles having larger particle size than mesh size of the 60 mesh JIS standard sieve) and (ii) content (%) of 80 mesh on particles (particles having larger particle size than mesh size of the 80 mesh JIS standard sieve) were measured.

(3) Fish eye

The following three evaluations ① to ③ were carried out.

① Trimellitic acid ester method

There were roll-kneaded 100 parts of the polyvinyl chloride particles, 50 parts of tris(2-ethylhexyl) trimellitate and 3 parts of a powdery lead stabilizer at 155° C. for 5 minutes to give a sheet having a thickness of 0.3 mm. After 3 minutes, 4 minutes, 5 minutes and 7 minutes from the start of roll-kneading, the number of fish eyes per 25 cm² on the sheet was measured.

② Polyester method

The number of fish eyes was measured in the same manner as in the above trimellitic acid ester method except that 100 parts of the polyvinyl chloride particles, 30 parts of DOP (di-2-ethylhexyl phthalate) and 30 parts of an adipic acid ester plasticizer (trade name: Diacizer D409, made by Mitsubishi Chemical Corporation) were roll-kneaded.

③ DOP method

The number of fish eyes was measured in the same manner as in the above trimellitic acid ester method except that 100 parts of the polyvinyl chloride particles, 50 parts of DOP, 3 parts of dioctyl tin dilaurate, 1 part of zinc stearate and 0.5 part of stearyl alcohol were roll-kneaded.

(4) Adhesion of scale

After taking out a slurry of the produced polyvinyl chloride from the autoclave, the inside surface of the autoclave was visually observed to evaluate the adhesion of scale. The criteria for evaluation are as follows:

A: There is no adhesion of scale and metallic luster on the inside surface of the autoclave is observed.

B: Metallic luster on the inside surface of the autoclave disappears or dull.

C: Scale adhered in the form of film is observed on the whole inside surface of the autoclave.

EXAMPLES 2 TO 6 AND COMPARATIVE EXAMPLES 1 TO 6

Partially hydrolyzed polyvinyl alcohol resins (dispersing stabilizers 2 to 11 and 14) shown in Table 1 were prepared, vinyl chloride polymers were prepared and properties of the vinyl chloride polymers were evaluated in the same manner as in Example 1.

The results of evaluation of the vinyl chloride polymers prepared by the polymerization methods A and B are shown in Table 2.

In the Examples, dispersing stabilizers having an absorbance of less than 0.1 measured at a wavelength of 280 nm with respect to the 0.1% aqueous solution thereof were prepared by conducting the polymerization of the monomer mixture in the absence of acetaldehyde.

Dispersing stabilizer 12 could not be evaluated because it was insoluble in water. Dispersing stabilizer 13 was not used in the polymerization test because it had water-insoluble components in a large amount and was not suitable as a dispersing stabilizer.

In the suspension polymerization of vinyl chloride in Example 3, an auxiliary dispersant (LL-02 made by The Nippon Synthetic Chemical Industry Co., Ltd.) was additionally used in an amount of 300 p.p.m. based on vinyl chloride.

In Comparative Example 5, the suspension polymerization of vinyl chloride was impossible because a block was formed during the polymerization.

In addition to the ingredients used in the Examples, other ingredients can be used in the Examples as set forth in the specification to obtain substantially the same results.

TABLE 1

| | | Degree of hydrolysis (% by mole) | Degree of polymerization PA | Hydrophobic group* Kind | Content (% by mole) | Anionic hydrophilic group** Kind | Content (% by mole) | Absorbance (280 nm) |
|---|---|---|---|---|---|---|---|---|
| Dispersing stabilizer | 1 | 75.2 | 720 | ① | 0.3 | ③ | 0.05 | 0.307 |
| | 2 | 77.3 | 825 | ② | 0.2 | ④ | 0.07 | 0.133 |
| | 3 | 80.0 | 730 | ① | 0.3 | ③ | 0.05 | 0.290 |
| | 4 | 79.5 | 735 | ① | 0.3 | ③ | 0.15 | 0.050 |
| | 5 | 76.0 | 730 | ① | 0.4 | ④ | 0.40 | 0.298 |
| | 6 | 75.4 | 722 | ① | 0.3 | — | — | 0.020 |
| | 7 | 77.0 | 730 | — | — | ③ | 0.25 | 0.308 |
| | 8 | 90.0 | 722 | ① | 0.3 | ③ | 0.05 | 0.300 |
| | 9 | 75.2 | 720 | ① | 0.05 | ③ | 0.05 | 0.280 |
| | 10 | 75.2 | 180 | ① | 11 | ③ | 0.05 | 0.010 |
| | 11 | 75.2 | 720 | ① | 0.3 | ③ | 0.01 | 0.302 |
| | 12 | 60.0 | 720 | ① | 0.4 | ③ | 0.05 | — |
| | 13 | 75.2 | 720 | ① | 0.4 | ③ | 15 | 0.250 |
| | 14 | 76.0 | 1500 | ① | 0.3 | ③ | 0.05 | 0.160 |

*Hydrophobic group (Oxypropylene group)
① Propylene oxide (15) monoallyl ether

TABLE 1-continued

|  | Degree of hydrolysis (% by mole) | Degree of polymerization PA | Hydrophobic group* Kind | Content (% by mole) | Anionic hydrophilic group** Kind | Content (% by mole) | Absorbance (280 nm) |
|---|---|---|---|---|---|---|---|

②Propylene oxide (30) monoallyl ether
**Anionic hydrophilic group
③Monomethyl maleate
④Itaconic acid

TABLE 2

|  |  | Example 1 | | Example 2 | | Example 3 | |
|---|---|---|---|---|---|---|---|
| Polymerization method | | A | B | A | B | A | B |
| Dispersing stabilizer | | 1 | 1 | 2 | 2 | 3 | 3 |
| Average degree of polymerization | | 1270 | 1271 | 1278 | 1275 | 1259 | 1257 |
| Particle size | | | | | | | |
| ①Average particle size | | 119 | 117 | 122 | 121 | 115 | 114 |
| ②Coarse particles 60 mesh on (%) | | 0 | 0 | 0 | 0 | 0 | 0 |
| 80 mesh on (%) | | 0 | 0 | 0 | 0 | 0 | 0 |
| Fish eye: Evaluation ① | 3 min. | 58 | 55 | 60 | 58 | 6 | 5 |
| | 4 min. | 3 | 2 | 8 | 5 | 1 | 1 |
| | 5 min. | 0 | 0 | 0 | 0 | 0 | 0 |
| | 7 min. | 0 | 0 | 0 | 0 | 0 | 0 |
| Fish eye: Evaluation ② | 3 min. | 21 | 19 | 27 | 25 | 3.5 | 2 |
| | 4 min. | 5 | 4 | 7 | 9 | 0 | 0 |
| | 5 min. | 0 | 0 | 0.5 | 0 | 0 | 0 |
| | 7 min. | 0 | 0 | 0 | 0 | 0 | 0 |
| Fish eye: Evaluation ③ | 3 min. | 82 | 85 | 100 | 102 | 12 | 11 |
| | 4 min. | 0 | 0 | 5 | 6 | 0 | 0 |
| | 5 min. | 0 | 0 | 0 | 0 | 0 | 0 |
| | 7 min. | 0 | 0 | 0 | 0 | 0 | 0 |
| Adhesion of scale | | A | A | A | A | A | A |

|  |  | Example 4 | | Example 5 | | Example 6 | |
|---|---|---|---|---|---|---|---|
| Polymerization method | | A | B | A | B | A | B |
| Dispersing stabilizer | | 4 | 4 | 5 | 5 | 14 | 14 |
| Average degree of polymerization | | 1268 | 1265 | 1250 | 1245 | 1236 | 1240 |
| Particle size | | | | | | | |
| ①Average particle size | | 133 | 134 | 132 | 138 | 118 | 120 |
| ②Coarse particles 60 mesh on (%) | | 0 | 0 | 0 | 0 | 0 | 0 |
| 80 mesh on (%) | | 0.2 | 0.1 | 0.3 | 0.2 | 0.1 | 0 |
| Fish eye: Evaluation ① | 3 min. | 42 | 40 | 40 | 43 | 38 | 32 |
| | 4 min. | 3 | 2 | 4 | 4 | 3 | 2 |
| | 5 min. | 0 | 0 | 0 | 0 | 0 | 0 |
| | 7 min. | 0 | 0 | 0 | 0 | 0 | 0 |
| Fish eye: Evaluation ② | 3 min. | 35 | 33 | 35 | 31 | 21 | 20 |
| | 4 min. | 8 | 5 | 7 | 5 | 8 | 9 |
| | 5 min. | 1 | 0.5 | 1 | 1 | 0 | 0.5 |
| | 7 min. | 0 | 0 | 0 | 0 | 0 | 0 |
| Fish eye: Evaluation ③ | 3 min. | 112 | 110 | 109 | 107 | 70 | 68 |
| | 4 min. | 10 | 8 | 13 | 7 | 4 | 3 |
| | 5 min. | 0.5 | 0.2 | 2 | 0.1 | 0 | 0 |
| | 7 min. | 0 | 0 | 0 | 0 | 0 | 0 |
| Adhesion of scale | | A | A | A | A | A | A |

|  |  | Com. Ex. 1 | | Com. Ex. 2 | | Com. Ex. 3 | |
|---|---|---|---|---|---|---|---|
| Polymerization method | | A | B | A | B | A | B |
| Dispersing stabilizer | | 6 | 6 | 7 | 7 | 8 | 8 |
| Average degree of polymerization | | 1259 | 1257 | 1281 | 1283 | 1251 | 1263 |
| Particle size | | | | | | | |
| ①Average particle size | | 145 | 125 | 138 | 137 | 180 | 185 |
| ②Coarse particles 60 mesh on (%) | | 3.5 | 0 | 0 | 0 | 4.5 | 5.0 |
| 80 mesh on (%) | | 5 | 0 | 0.5 | 0 | 7.5 | 7.3 |
| Fish eye: Evaluation ① | 3 min. | 1231 | 52 | 70 | 65 | 1800 | 1750 |
| | 4 min. | 156 | 11 | 22 | 18 | 350 | 380 |
| | 5 min. | 30 | 2 | 9 | 4 | 200 | 128 |
| | 7 min. | 8 | 0 | 1 | 0.5 | 12 | 9 |
| Fish eye: Evaluation ② | 3 min. | 62 | 29 | 52 | 50 | 300 | 280 |
| | 4 min. | 12 | 8 | 10 | 9 | 162 | 152 |

TABLE 2-continued

|  |  | Com. Ex. 4 A | Com. Ex. 4 B | Com. Ex. 5 A | Com. Ex. 5 B | Com. Ex. 6 A | Com. Ex. 6 B |
|---|---|---|---|---|---|---|---|
|  | 5 min. | 3 | 0 | 2 | 1 | 120 | 112 |
|  | 7 min. | 2 | 0 | 0 | 0 | 21 | 12 |
| Fish eye: Evaluation ③ | 3 min. | 198 | 58 | 65 | 62 | 420 | 450 |
|  | 4 min. | 4 | 7 | 10 | 5 | 45 | 38 |
|  | 5 min. | 1 | 0 | 2 | 1 | 32 | 28 |
|  | 7 min. | 0 | 0 | 0 | 0 | 11 | 9 |
| Adhesion of scale |  | B | A | B | B | B | B |

|  |  | Com. Ex. 4 | | Com. Ex. 5 | | Com. Ex. 6 | |
|---|---|---|---|---|---|---|---|
| Polymerization method |  | A | B | A | B | A | B |
| Dispersing stabilizer |  | 9 | 9 | 10 | 10 | 11 | 11 |
| Average degree of polymerization |  | 1260 | 1261 | — | — | 1262 | 1260 |
| Particle size |  |  |  |  |  |  |  |
| ① Average particle size |  | 148 | 129 | — | — | 145 | 127 |
| ② Coarse particles | 60 mesh on (%) | 4.0 | 0 | — | — | 3.2 | 0 |
|  | 80 mesh on (%) | 6.0 | 0.2 | — | — | 6.5 | 0 |
| Fish eye: Evaluation ① | 3 min. | 1230 | 67 | — | — | 750 | 50 |
|  | 4 min. | 126 | 45 | — | — | 100 | 10 |
|  | 5 min. | 28 | 15 | — | — | 28 | 3 |
|  | 7 min. | 10 | 8 | — | — | 7 | 0 |
| Fish eye: Evaluation ② | 3 min. | 72 | 35 | — | — | 35 | 27 |
|  | 4 min. | 15 | 12 | — | — | 7 | 6 |
|  | 5 min. | 5 | 2 | — | — | 4 | 1 |
|  | 7 min. | 3 | 0 | — | — | 1 | 0 |
| Fish eye: Evaluation ③ | 3 min. | 212 | 65 | — | — | 82 | 48 |
|  | 4 min. | 25 | 12 | — | — | 12 | 3 |
|  | 5 min. | 3 | 2 | — | — | 0 | 0 |
|  | 7 min. | 0 | 0 | — | — | 0 | 0 |
| Adhesion of scale |  | C | B | — | — | B | A |

What is claimed is:

1. A dispersing stabilizer comprising a partially hydrolyzed polyvinyl alcohol resin
having a degree of hydrolysis of 65 to 85% by mole, and containing 0.1 to 10% by mole of an oxyalkylene group, in its side chains, represented by the formula (1):

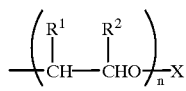

(1)

wherein $R^1$ is hydrogen atom or an alkyl group, $R^2$ is an alkyl group, X is hydrogen atom, an alkyl group, an alkylamide group or an alkyl ester group, and n is a positive number, and
0.2 to 10% by mole of an anionic hydrophilic group, in its side chains and/or terminal;
wherein the average degree of polymerization (PA) of said partially hydrolyzed polyvinyl alcohol resin is 400 to 2,000, and the average degree of polymerization (PA) and the content "a" (% by mole) of said anionic hydrophilic group satisfy the relationship represented by the equation (2):

$$0.1 < PA \times a \times 10^{-2} < 2 \qquad (2).$$

2. The dispersing stabilizer of claim 1, wherein said partially hydrolyzed polyvinyl alcohol resin has an absorbance of not less than 0.1 measured at a wavelength of 280 nm in ultraviolet ray absorption spectrum with respect to the 0.1% by weight aqueous solution thereof.

3. The dispersing stabilizer of claim 1, wherein said anionic hydrophilic group is carboxyl group.

4. The dispersing stabilizer of claim 1, wherein the average degree of polymerization (PA) and the content "a" satisfy the relationship represented by the equation:

$$0.1 < PA \times a \times 10^{-2} < 1.2.$$

* * * * *